T. ST. JEAN.
LEG SPREADER FOR HORSES.
APPLICATION FILED OCT. 1, 1913.
1,104,843.
Patented July 28, 1914.
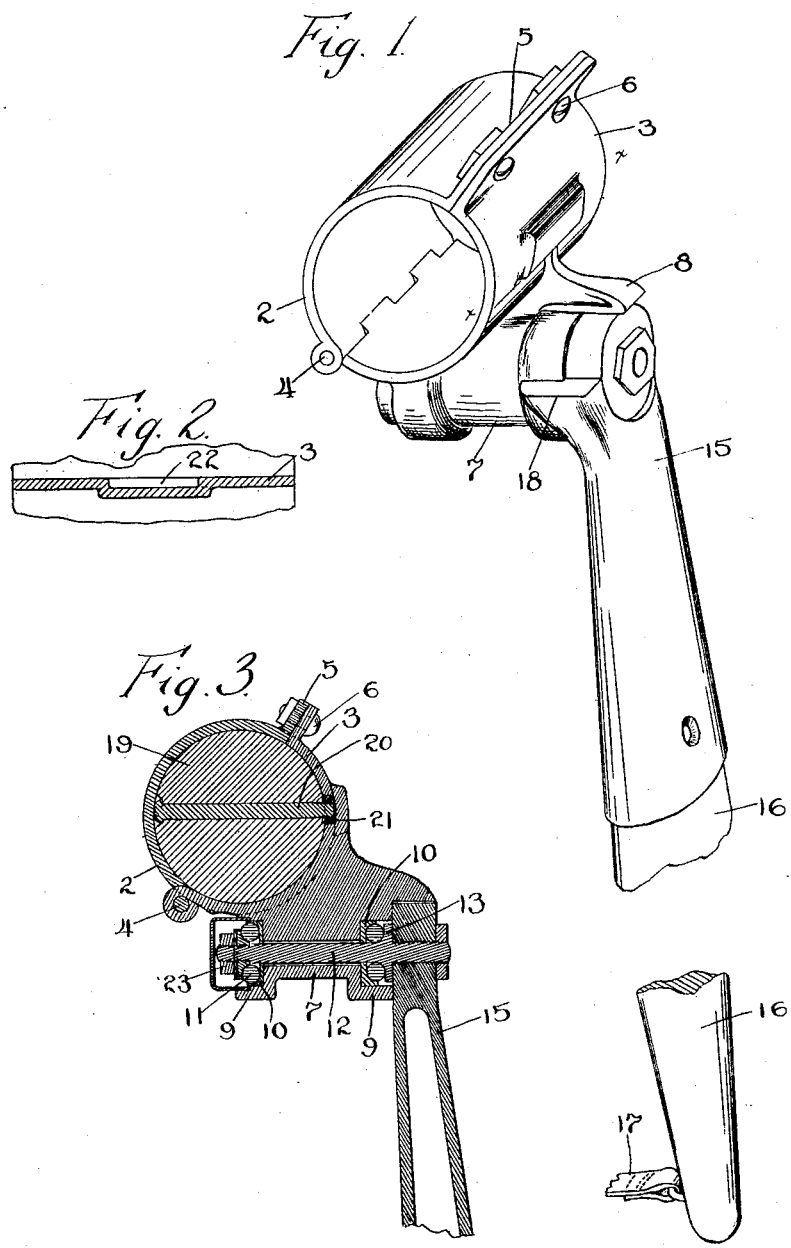
WITNESSES
INVENTOR
Telesphore St Jean

UNITED STATES PATENT OFFICE.

TÉLESPHORE ST. JEAN, OF ST. PAUL, MINNESOTA.

LEG-SPREADER FOR HORSES.

1,104,843.   Specification of Letters Patent.   Patented July 28, 1914.

Application filed October 1, 1913.   Serial No. 792,736.

*To all whom it may concern:*

Be it known that I, TÉLESPHORE ST. JEAN, a citizen of the United States, residing at St. Paul, in the county of Ramsey and State of Minnesota, have invented certain new and useful Improvements in Leg-Spreaders for Horses, of which the following is a specification.

My invention relates to improvements in leg spreaders for horses of that type wherein spreader sticks are connected with the horse's hind legs and supported from the thill.

My invention has for its object particularly to provide improved means for attaching the device to the thill and supporting the spreader sticks from the thill supported portion to make the device particularly easy of attachment; to keep the device from twisting upon the thill and to prevent the spreader sticks flying up and striking the horse.

To this end the invention consists in the features of construction, combination and arrangement of parts hereinafter described and claimed.

In the accompanying drawings forming part of this specification, Figure 1 is a cabinet projection of my device showing the connected spreader stick partly broken away; Fig. 2 is a section on line *x—x* of Fig. 1, and Fig. 3 is a transverse section through the device and contained thill.

As shown in the drawings, the device includes a tubular thill clamp made up of two longitudinal members 2 and 3 having hinge connection 4, the free edges of the clamps being formed with outwardly extending flanges 5 adapted to be connected by bolts 6. Extending downwardly and outwardly from the clamp member 3 is a journal box 7, the outer end of the journal box being connected from its upper side with the member 3 by a web 8. The journal box is formed at each end with a cup holding portion 9, supporting bearing members 10 depending from ball bearings 11. A shaft 12 passes through the box, being formed at its opposite ends with bearing cones 13 coöperating with the ball bearings. A suitable lock nut 23 is shown threaded upon the inner end of the shaft to adjust the bearing. On the other end of the shaft is supported a ferrule 15 in the lower end of which ferrule is secured the upper end of the spreader stick 16. The lower end of the spreader stick is adapted to be secured to the horse's leg by a suitable cord or elastic 17. The upper end of the ferrule 15 is formed upon one side with a shoulder 18 coöperating with the web 8, as hereinafter pointed out.

The thill clamp is adapted to be supported in position upon the thill 19 through the medium of the bolt 20 extending through the thill and carrying upon its outer end a rectangular nut 21 adapted to project into an oblong rectangular recess 22 inside the clamp member 3.

In use the spreader moves with the action of the horse's legs in the ordinary manner, securing a smooth and free movement of the parts through the medium of the ball bearing between the supporting shaft of the spreader stick and the thill clamp.

When it is desired to use my device, the clamp member may be quickly and easily applied to the thill by opening up the hinged members and placing upon the thill, as shown in Fig. 2, the nut 21 extending into the recess 22. The clamp members are connected through the medium of the bolt 6 and spreader sticks connected with the horse's leg, not shown, through the medium of cords 17. It will be understood that these spreader sticks are used in pairs, one for each side of the horse. The spreader stick will then in use move with the action of the horse's legs, smooth and easy movement of the parts being secured through the medium of the anti-friction bearing for the shaft 12. Where, as often happens, the cord 17 breaks, causing the spreader stick to be thrown upwardly with considerable force, the stick will be prevented from hitting the horse by reason of the shoulder 18 upon the ferrule striking the web 8 and the thill clamp will be kept from twisting upon the thill by reason of the rectangular nut 21 projecting into the rectangular recess 22. With the ordinary device runaways are frequently caused by the spreader stick flying upward and striking the horse, but with my construction this is absolutely prevented and the clamp kept from twisting upon the thill by the coöperation of the shoulder 18, web 8, and the rectangular recess 22 with the rectangular nut projecting therein. The recess 22 being elongated, as shown, allows sliding adjustment upon the thill.

I claim as my invention:

1. A device of the class described comprising a tubular clamp formed of hinged members, a spreader stick having journal support upon the underside of one of said members, a fixed shoulder above the journaled end of the spreader stick and a cooperating shoulder projecting outwardly from one side of the journaled end of the spreader stick.

2. A device of the class described comprising a tubular clamp, a spreader stick having journal support under said clamp, a web connecting said clamp and journal support of said spreader stick and a stop projecting outwardly from the journaled head of said spreader stick upon one side of said web, for the purpose set forth.

3. A device of the class described comprising in combination with a thill, a tubular bearing part supported transversely underneath said clamp and projecting from one side thereof, a web connecting the projecting part of said bearing part and tubular clamp and serving as a shoulder, a cooperating shoulder carried by the journaled end of said spreader stick at one side of said web, and a squared projection carried by said thill, said clamp having formed therein an oblong rectangular recess to receive said projection.

In testimony whereof I affix my signature in presence of two witnesses.

TÉLESPHORE ST. JEAN.

Witnesses:
H. S. JOHNSON,
H. SWANSON.

Copies of this patent may be obtained for five cents each, by addressing the "Commissioner of Patents, Washington, D. C."